US007995535B2

(12) United States Patent
Hobza

(10) Patent No.: US 7,995,535 B2
(45) Date of Patent: *Aug. 9, 2011

(54) METHOD AND APPARATUS FOR DISTRIBUTING DATA TO A MOBILE DEVICE USING PLURAL ACCESS POINTS

(75) Inventor: James Hobza, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/749,993

(22) Filed: Mar. 30, 2010

(65) Prior Publication Data

US 2010/0182941 A1    Jul. 22, 2010

Related U.S. Application Data

(63) Continuation of application No. 12/245,446, filed on Oct. 3, 2008, now Pat. No. 7,688,787, which is a continuation of application No. 10/229,636, filed on Aug. 27, 2002, now Pat. No. 7,433,336.

(51) Int. Cl.
*H04W 4/00*    (2009.01)
(52) U.S. Cl. ............... 370/331; 370/335; 455/436
(58) Field of Classification Search ............... None
See application file for complete search history.

(56) References Cited

U.S. PATENT DOCUMENTS

| 6,308,066 | B1 | 10/2001 | Ranta et al. |
| 6,320,855 | B1 | 11/2001 | Shi |
| 6,522,670 | B1 | 2/2003 | Jokinen et al. |
| 6,674,736 | B1 | 1/2004 | Tiedemann, Jr. |
| 7,010,058 | B2 | 3/2006 | Diepstraten et al. |
| 7,047,010 | B2 | 5/2006 | Semper |
| 7,146,636 | B2 | 12/2006 | Crosbie |
| 7,193,991 | B2 | 3/2007 | Melpignano et al. |
| 7,433,336 | B1 * | 10/2008 | Hobza ............... 370/331 |
| 7,558,226 | B2 * | 7/2009 | Anderson et al. ........ 370/311 |
| 7,688,787 | B2 * | 3/2010 | Hobza ............... 370/331 |
| 2001/0024953 | A1 | 9/2001 | Balogh |
| 2001/0041594 | A1 | 11/2001 | Arazi et al. |
| 2002/0085719 | A1 | 7/2002 | Crosbie |

OTHER PUBLICATIONS

Bluetooth Architecture Overview, p. 17-20, by James Kardach, Intel Corp., 1998, pp. 17-20.
Specification of the Bluetooth System, Profiles, Version 1.1 Feb. 22, 2001, p. 111.
Specification of the Bluetooth System, Wireless Connections Made Easy v. 1.0B Dec. 1, 1999, pp. 1-1080.

* cited by examiner

*Primary Examiner* — Michael J Moore, Jr.
(74) *Attorney, Agent, or Firm* — McAndrews, Held & Malloy, Ltd.

(57) ABSTRACT

A system and method for providing connectivity between mobile devices and access points of a network without redundant solicitation of communication by the mobile device at each access point is described. The method involves receiving a data packet at a first access point in a control group; transmitting the data packet from the first access point to the mobile device; determining if the mobile device acknowledges receipt of the data packet; responsive to determining that the mobile device failed to acknowledge receipt of the data packet, forwarding the data packet to a second access point; and transmitting the data packet from the second access point to the mobile device.

28 Claims, 5 Drawing Sheets

METHOD AND APPARATUS FOR DISTRIBUTING DATA TO A MOBILE DEVICE USING PLURAL ACCESS POINTS

CROSS-REFERENCE TO RELATED APPLICATIONS

The present application is a CONTINUATION of U.S. application Ser. No. 12/245,446, filed Oct. 3, 2008, now issued U.S. Pat. No. 7,688,787 B2, which is a CONTINUATION of U.S. application Ser. No. 10/229,636, filed Aug. 27, 2002, now issued U.S. Pat. No. 7,433,336 B1. The above-identified applications are hereby incorporated herein by reference in their entirety.

FIELD OF THE INVENTION

The present invention relates to wireless access points. In particular, but not by way of limitation, the present invention relates to systems and methods for providing connectivity between mobile devices and access points of a network without redundant solicitation of communication by the mobile device at each access point.

BACKGROUND OF THE INVENTION

With the recent proliferation of wireless-enabled devices, companies are competing to develop and efficiently use new short and medium-range network access protocols and network access systems. For example, one such protocol is Bluetooth, which is an industry specification that describes how mobile phones, computers, and personal digital assistants (PDAs) can easily interconnect with each other and with home and business phones and computers using a short-range wireless connection. Bluetooth and similar protocols use access points spaced around a particular area—such as a business, an airport, a shopping mall, etc.—to provide connectivity between a network and a mobile device as the mobile device moves around the defined area. Bluetooth-enabled wireless devices, for example, can only transmit 10 meters, thereby requiring that Bluetooth-enabled access points to be spaced accordingly.

FIG. 1 illustrates an existing short/medium range wireless access system 100. In this system 100, three access points 110 A-110 C are connected to a network layer 115. Each access point is associated with a corresponding coverage area 112. Also connected to the network layer 115 is an external network 120 that includes the end point 125, which could be, for example, a Web server. The access points 110 in such a system 100 could operate according to Bluetooth or according to some other communication protocol.

Assuming that the access points 110 in FIG. 1 operate according to Bluetooth, the mobile device 130 is required to maintain a connection to one of the three access points 110 at all times if it is to communicate with the end point 125. Bluetooth, however, limits the number of mobile devices that can be actively connected to an access point at any given time. Thus, to service more mobile devices, a Bluetooth-enabled access point can place a mobile device in a non-active connection, or standby status, known as a Park mode in Bluetooth terms.

To be placed in the Park mode, the mobile device 130 first connects with an access point 110A and requests to be placed in the Park mode. When the mobile device 130 moves to a coverage area covered by a different access point, such as from point *A to point *B, present technology requires that the mobile device 130 establish a connection with the new access point, such as access point 110B associated with point *B, and that the mobile device 130 request the new access point 110B to place it in Park mode.

Forcing a mobile device 130 to request placement in Park mode each time that the mobile device 130 moves between coverage areas introduces several inefficiencies. For example, most mobile devices are power consumption sensitive. The extra communications required by continually requesting to be placed in Park mode can quickly drain the batteries of a mobile device 130. Further, the communication channels available to the typical access point are limited. By repeatedly requesting to be placed in Park mode, mobile devices unnecessarily use these limited communication channels and thereby block other mobile devices from communicating with the access point. Additionally, while the mobile device is requesting to be placed in Park mode by the new access point, the mobile device is not connected to the network and is thus not available for communication with the end point. In fact, the mobile device cannot even be located until the connection process with the new access point is completed.

Although present systems and methods are functional, they are not sufficiently satisfactory. Accordingly, a system and method are needed to address the shortfalls of present technology and to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present invention provides a system and method for effecting connectivity between mobile devices and access points of a network without redundant solicitation of communication by the mobile device at each access point. In one exemplary embodiment, the present invention can include a plurality of associated access points, hereinafter referred to as a "coverage group." Mobile devices within range can be in communication synchronization with any access point within the coverage group, thereby allowing a mobile device to maintain connectivity with the network even as the mobile device moves between access points.

In one exemplary embodiment, a data packet addressed for a particular mobile device is transmitted from an end point to a first access point within the coverage group. The first access point can then transmit the packet, or some other data item, to the mobile device. Assuming that the mobile device is within range of the first access point, the mobile device can receive the packet and provide an acknowledgement to the first access point. If the first access point does not receive an acknowledgement from the mobile device, the first access point can assume that the mobile device is no longer in its coverage area and forward the packet to other access points in the coverage group. These other access points can then attempt to deliver the packet to the mobile device.

To aid the mobile device in communicating with the coverage group, the access points within the coverage group (or at least some access points within the coverage group) can transmit a coverage area control channel (hereinafter also referred to as a "control channel"). This control channel can include information sufficient for enabling a mobile device to obtain communication synchronization with at least one neighboring access point. In other words, the control channel contains enough information to enable a mobile device to communicate with an access point near the access point to which the mobile device is currently synchronized. Such control channel information could include, but is by no means limited to, any one or any combination of the following: neighboring access point addresses, neighboring access point clock timing, differential timing between the host access point and one or more neighboring access points, and timing information for locating control channels of neighboring access points. Additionally, the control channel can include the identification of the wireless coverage group of each access point that it describes.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
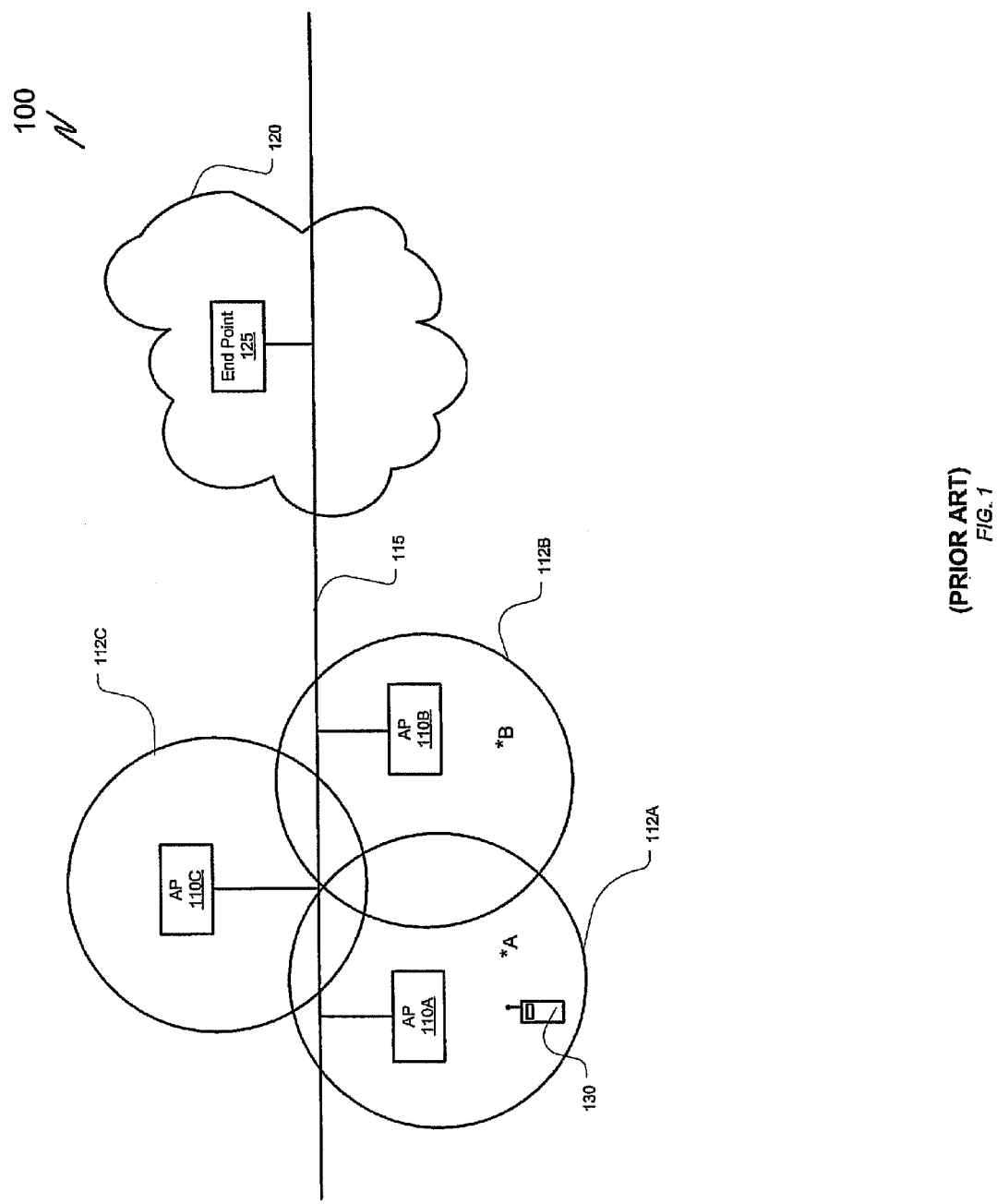
FIG. 1 illustrates an existing wireless system.
Figure 2:
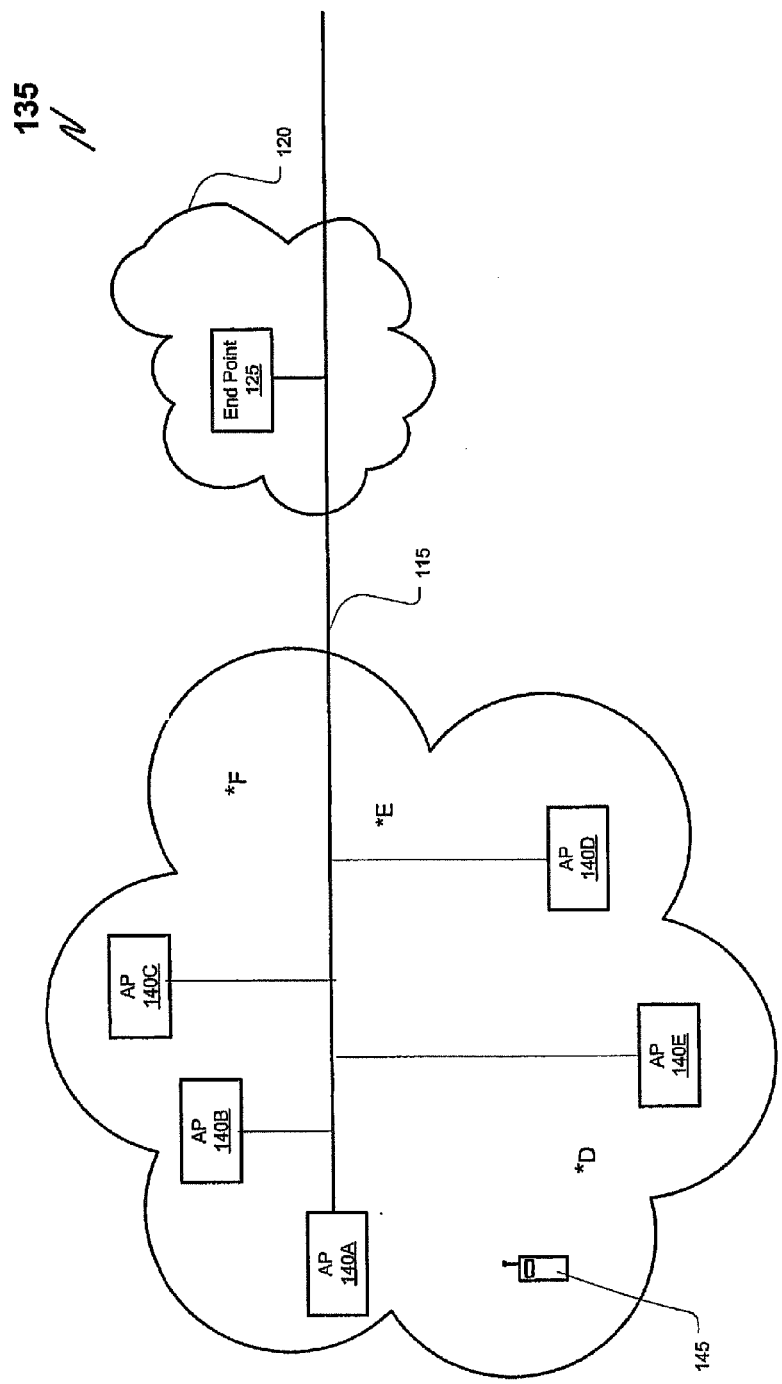
FIG. 2 illustrates one embodiment of a wireless system constructed in accordance with the principles of the present invention.

Referring now to the drawings, where like or similar elements are designated with identical reference numerals throughout the several views, and referring in particular to FIG. 2, it illustrates one embodiment of a wireless system 135 constructed in accordance with the principles of the present invention. This embodiment includes a coverage group comprised of access points 140A-140E. Together, these access points 140A-140E provide coverage to the mobile device 145 over the coverage area. As the mobile device 145 moves from point *D to point *E to point *F, the mobile device 145 can remain in communication synchronization, e.g., establish a passive communication link, without a two-way exchange of data with the appropriate access point 140. In particular, one embodiment of the present invention can enable a mobile device 145 to establish communication synchronization with an access point 140 without requesting the access point to put it in a standby, e.g., Park, mode.

Figure 3:
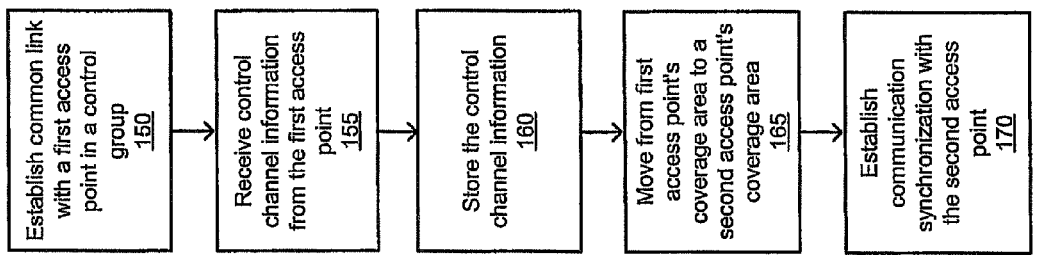
FIG. 3 is a flowchart of one method for operating the wireless system illustrated in FIG. 2.

The operation of the system shown in FIG. 2 is best illustrated by reference to the flowchart of FIG. 3. Initially, the mobile device 145 establishes a communication link with a first access point 140 in the coverage group (step 150). The mobile device 145 can then request to be placed in a standby mode. While in standby mode, the mobile device 145 can receive data from the first access point 140 over a control channel, which can take various forms (step 155). For example, the control channel can include a set of packets that are transmitted at clock times that have been predefined to signify the control channel. The times of control channel transmissions may either be fixed or may be modified by the control channel itself. Alternatively, the control channel could include a set of packets that contain a field of information that specifically identifies the packet as a control channel packet. In yet other embodiments, the control channel can include combinations of the above-described control channel implementations. Notably, the packets that comprise the control channel can, but need not be sent with broadcast addressing.

Once the mobile device 145 has received control channel data, it can store all or portions of that data in a local storage system (step 160). By caching the control channel data, the mobile device 145 can decrease the time needed to establish communication synchronization with neighboring access points 140. In alternate embodiments, the control channel data is not cached. Rather, the data is used as it is received.

As the mobile device 145 moves from the coverage area of one access point 140 to the coverage area of a second access point 140, such as from point *D to point *F, the mobile device 145 can establish communication synchronization with the appropriate access point, such as the access point 140 C providing coverage to point *F (steps 165 and 170). To establish communication synchronization with the new access point 140 C, the mobile device 145 can use data from the previously received control channel. Such communication synchronization enables the mobile device 145 to listen for transmissions from the new access point 140C without requiring the mobile device 145 to establish a connection with access point 140C or to actively upload data to the new access point 140C.

Figure 4:
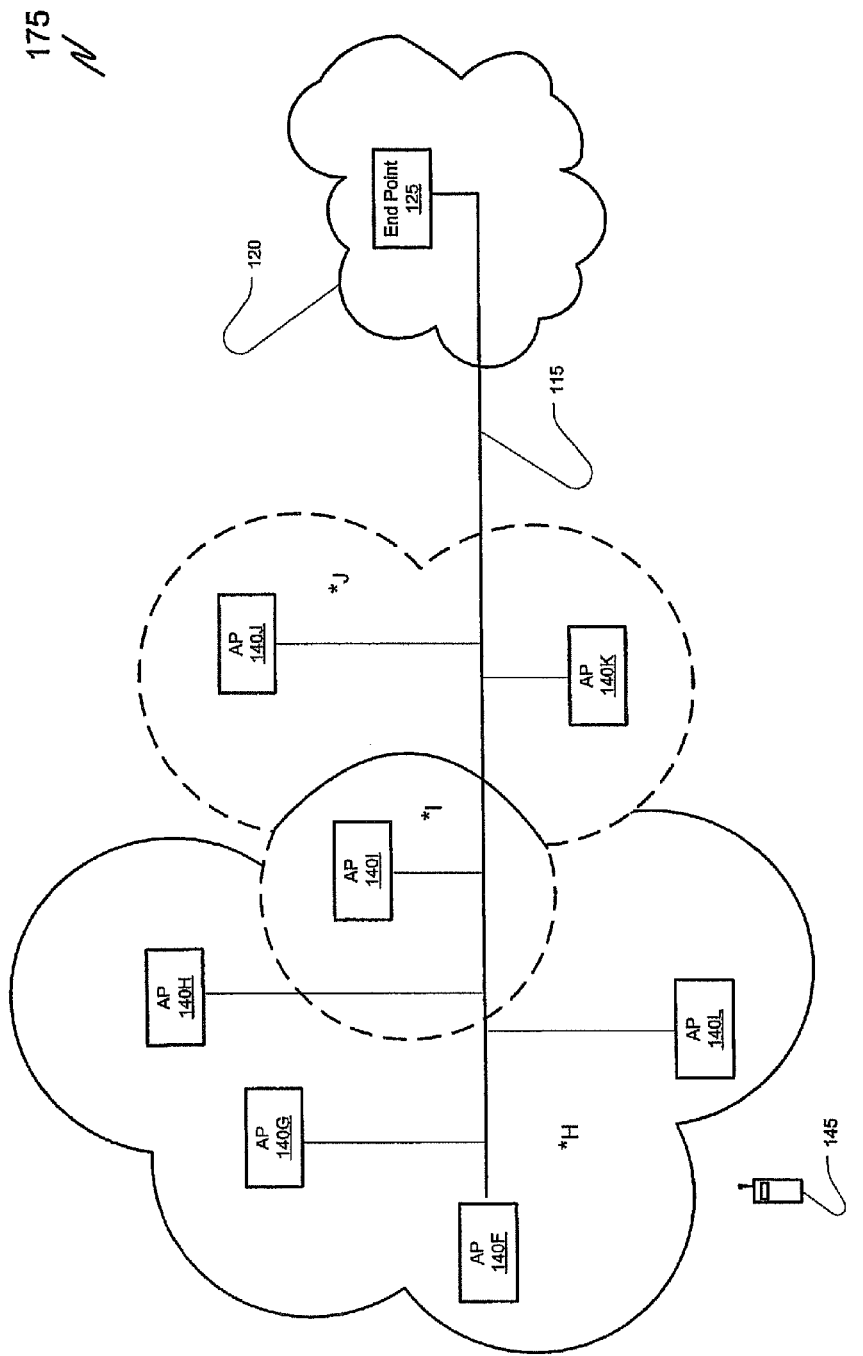
FIG. 4 is an alternate embodiment of a wireless system constructed in accordance with the principles of the present invention.

FIG. 4 is an alternate embodiment of a wireless system 175 constructed in accordance with the principles of the present invention. This embodiment is similar to the embodiment illustrated in FIG. 2 except that the embodiment in FIG. 4 the applicable coverage group is comprised of overlapping, neighboring coverage group subsets. The first coverage group subset is comprised of access points 140F, 140G, 140H, 140I, and 140L; and the second coverage group subset is comprised of access points 140I, 140J, and 140K.

When a mobile device 145 moves between points in different coverage group subsets, the mobile device 145 could be required to actively communicate with an access point in the new coverage group subset to return the mobile device 145 back to standby mode. Once placed in standby mode, the mobile device 145 could establish communication synchronization with any access point 140 within that coverage group subset as previously described.

With overlapping coverage group subsets as shown in FIG. 4, however, the need to actively communicate with an access point in a new coverage group subset to reenter standby mode can be avoided. For example, if the mobile device 145 moves from point *H to point *I to point *J, such an active request can be avoided because the mobile device 145, at one point, establishes communication synchronization with access point 140I, which is a member of both coverage group subsets. The control channel for access point 140I can provide the mobile device 145 with information about access points 140 in both coverage group subsets, thereby enabling the mobile device 145 to move to either coverage group subset without actively requesting to be placed back into standby mode.

Coverage groups can be established in a variety of ways. For instance, a coverage group can be comprised of preselected access points. These access points could be selected, for example, based upon spatial location within a building or likely travel patterns of a mobile device. Alternatively, coverage groups can be defined relative to each individual access point or to groups of access points. For example, a first coverage group could consist of all access points within one hundred yards of a first access point, and a second coverage group could be defined as all access points within one hundred yards of a second access point. As can be appreciated, these coverage groups or subsets thereof could significantly overlap.

Figure 5:
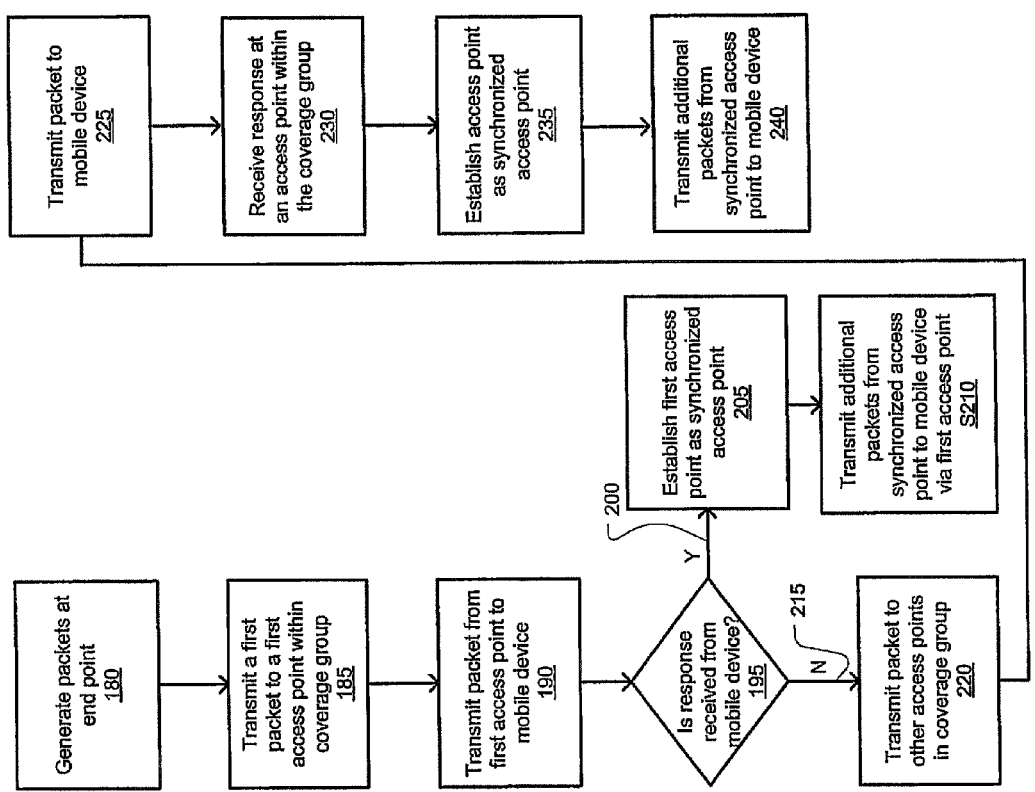
FIG. 5 is a flowchart of one method for using a control channel.

Referring now to FIG. 5, a flowchart is provided of one method for using a control channel in accordance with the present invention. Generally, existing technology requires an access point 140 to know the identity of the mobile devices 145 with which it can communicate. However, an access, point 140 within a coverage group as previously described might not be aware that a mobile device 145 has established communication synchronization with it. The steps shown in FIG. 5 address this issue.

Initially, a mobile device 145 establishes a communication link with a first access point 140 and requests to be placed in a standby mode. Next, the mobile device 145 moves from the coverage area serviced by the first access point 140 to a coverage area serviced by a second access point 140. Data packets that are generated by an end point are passed through the network layer to the first access point 140, which is a member of a coverage group (step 180). The first access point 140 transmits the received data packet to the mobile device (step 185). If the mobile device 145 responds to the transmission, such as through sending an acknowledgement (step 195), branch 200 is followed and the first access point 140 is established as the synchronized access point (step 205). Additional packets generated by the end point are then routed to the first access point 140 and on to the mobile device 145 (step 210).

When the mobile device 145 does not respond to the transmission by the first access point 140, branch 215 is followed and the data packet is sent to other access points 140 in the coverage group (step 220). The first access point 140 can broadcast the data packet to all access points 140 in the coverage group or can broadcast to only certain access points 140 in the coverage group based, for example, upon a "best guess" algorithm. In alternate embodiments, the first access point 140 can provide data other than the actual data packet to the other access points 140. For example, the first access point 140 could merely provide the other access points 140 with the address of the mobile device 145 sought. The other access points 140 could then attempt to locate the mobile device 145 using that address. Once located, the data packets could be routed to the appropriate access point 140.

Assuming that the first access point transmits the data packet to other access points within the coverage group, the other access points 140 can attempt to deliver the packet to the mobile device 145 (step 225). If the mobile device 145 is in the coverage area of one of those access points 140, the mobile device 145 can provide an acknowledgment to the appropriate access point (step 230). That access point can then be established as the access point with which the mobile device is actively linked (step 235). Additional packets generated by the end point can then be routed to the mobile device 145 via that access point.

In general, many of the techniques described above relate to the transmission of data packets from a first access point to other access points for distribution to a mobile device when the first access point fails to receive an appropriate response from the mobile device. It should be understood that related approaches, such as those involving the exchange of signaling information between a mobile device and an access point prior to distribution of a data packet, are also within the scope of the present invention. For example, consider the case in which a first access point 140 receives a data packet to be distributed to a mobile device 145. When the data packet arrives at the first access point 140, it sends a signaling packet to the mobile device 145. The signaling packet may, for example, "wake" the mobile device 145 from a low power mode, cause a connection to be made between the mobile device 145 and the first access point 140, or cause both events to occur. If receipt of the signaling packet by the mobile device 145 leads to achievement of such a result, the first access point 140 sends the data packet, or stream of data packets, to the mobile device 145. If such a result is not achieved via the signaling packet, the first access point 140 may either forward the data packet or send an administrative packet through the network layer to the other access points 140 of the applicable coverage group. Each of the other access points 140 may then attempt to communicate with the mobile device 145 via the above signaling method. If any of such other access points 140 is successful in this regard, it sends the data packet to the mobile device 145. Moreover, the first access point 140 may exchange signaling packets with at least the successful access point 140 in order to establish a route for subsequent data packets to be forwarded to the mobile device 145 via the successful access point 145.

In conclusion, the present invention provides, among other things, a system and method for providing connectivity between mobile, devices and access points of a network without redundant solicitation of communication by the mobile device at each access point. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A system for wireless communications, comprising:
a mobile wireless communications device that establishes a communications link with a first wireless communications device,
wherein the mobile wireless communications device enters a standby mode,
wherein, while in the standby mode in a coverage area associated with the first wireless communications device, the mobile wireless communications device wirelessly receives information about the first wireless communications device and at least one other wireless communications device, and
wherein, responsive to the mobile wireless communications device moving from the coverage area associated with the first wireless communications device to a coverage area associated with the at least one other wireless communications device, the mobile wireless communications device uses the received information to establish communications synchronization with the at least one other wireless communications device without first establishing a communications link with the at least one other wireless communications device.

2. The system according to claim 1, wherein the first wireless communications device and the at least one other wireless communications device are part of a coverage group.

3. The system according to claim 1, wherein the mobile wireless communications device wirelessly receives the information over a control channel, and wherein the control channel is associated with a set of packets that are transmitted at clock times that have been predefined to signify the control channel.

4. The system according to claim 3, wherein transmission times of the control channel are fixed.

5. The system according to claim 3, wherein transmission times of the control channel are modified by the control channel.

6. The system according to claim 3, wherein the set of packets comprises information that identifies the set of packets as control channel packets.

7. The system according to claim 3, wherein the mobile wireless communications device comprises a mobile phone.

8. The system according to claim 7, wherein the mobile wireless communications device supports spread spectrum communications.

9. The system according to claim 8, wherein the mobile wireless communications device is Bluetooth-enabled.

10. The system according to claim 3, wherein the mobile wireless communications device comprises a personal digital assistant (PDA).

11. The system according to claim 3, wherein the mobile wireless communications device comprises a computer.

12. The system according to claim 3, wherein the mobile wireless communications device is Bluetooth-enabled.

13. The system according to claim 1, wherein the mobile wireless communications device establishes the communications link with a first wireless communications device and enters the standby mode while in the coverage area associated with the first wireless communications device.

14. The system according to claim 2, wherein the first wireless communications device and the at least one other wireless communications device associated with the coverage group have overlapping coverage areas.

15. The system according to claim 1, wherein the mobile wireless communications device stores the received information so that the stored information can be used when the mobile wireless communications device moves from the coverage area associated with the first wireless communications device to the coverage area associated with the at least one other wireless communications device.

16. The system according to claim 1, wherein, responsive to the mobile wireless communications device moving from the coverage area associated with the first wireless communications device to a coverage area associated with the at least one other wireless communications device, the mobile wireless communications device establishes a passive communications link with the at least one other wireless communications device.

17. The system according to claim 1, wherein the standby mode comprises a park mode.

18. The system according to claim 1, wherein the mobile wireless communications device comprises a mobile phone.

19. The system according to claim 18, wherein the mobile wireless communications device supports spread spectrum communications.

20. The system according to claim 19, wherein the mobile wireless communications device is Bluetooth-enabled.

21. The system according to claim 1, wherein the mobile wireless communications device comprises a personal digital assistant (PDA).

22. The system according to claim 1, wherein the mobile wireless communications device comprises a computer.

23. The system according to claim 1, wherein the mobile wireless communications device is Bluetooth-enabled.

24. The system according to claim 1, wherein the first wireless communications device is Bluetooth-enabled.

25. The system according to claim 1, wherein after the mobile wireless communications device establishes the communications link with the first wireless communications device, the mobile wireless communications device requests from the first wireless communications device that the mobile wireless communications device be placed in the standby mode.

26. The system according to claim 1, wherein the mobile wireless communications device establishes the communications link with the first wireless communications device over a frequency-hopped communications channel.

27. The system according to claim 1, wherein the mobile wireless communications device establishes communications synchronization with the at least one other wireless communications device without the at least one other wireless communications device receiving identification information about the mobile wireless communications device.

28. The system according to claim 1, while the mobile wireless communications device is in the standby mode in the coverage area associated with the at least one other wireless communications device, the mobile wireless communications device establishes communications synchronization with the at least one other wireless communications device without first establishing the communications link with the at least one other wireless communications device.

* * * * *